United States Patent
Shirasaka

(10) Patent No.: US 9,298,483 B2
(45) Date of Patent: Mar. 29, 2016

(54) MEDIUM, IMAGE PROCESSING APPARATUS, IMAGE FORMING SYSTEM, AND IMAGE FORMING APPARATUS

(71) Applicant: OKI DATA CORPORATION, Tokyo (JP)

(72) Inventor: Mitsuyoshi Shirasaka, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 63 days.

(21) Appl. No.: 14/057,443

(22) Filed: Oct. 18, 2013

(65) Prior Publication Data

US 2014/0115608 A1   Apr. 24, 2014

(30) Foreign Application Priority Data

Oct. 22, 2012 (JP) .................. 2012-232763

(51) Int. Cl.
 G06F 9/445 (2006.01)
 G06F 9/44 (2006.01)
 G06F 3/12 (2006.01)
(52) U.S. Cl.
 CPC .......... *G06F 9/44526* (2013.01); *G06F 3/1204* (2013.01); *G06F 3/1225* (2013.01); *G06F 3/1285* (2013.01); *G06F 9/4411* (2013.01)

(58) Field of Classification Search
 None
 See application file for complete search history.

(56) References Cited

U.S. PATENT DOCUMENTS

| 2009/0100334 A1* | 4/2009 | Hull .................. G06F 17/30011 715/255 |
| 2010/0302589 A1* | 12/2010 | Kobayashi .................. 358/1.15 |
| 2010/0315662 A1* | 12/2010 | Fukunishi ............. G06F 3/1205 358/1.9 |

FOREIGN PATENT DOCUMENTS

JP   2008-217097 A   9/2008

* cited by examiner

*Primary Examiner* — Tuan Dao
(74) *Attorney, Agent, or Firm* — Kubotera & Associates, LLC

(57) ABSTRACT

A non-transitory computer readable medium stores a driver installer to install a program that causes a computer to execute functional units for operating an image processing apparatus. The driver installer includes a driver installing unit and a plug-in installing unit. The driver installing unit is for retrieving a printer driver package including a file necessary for operating a printer driver, and for installing the file as the printer driver. The plug-in installing unit is for retrieving a plug-in package including a plug-in information file and a plug-in file for adding a function, and for registering the plug-in information file and the plug-in file.

8 Claims, 11 Drawing Sheets

MEDIUM, IMAGE PROCESSING APPARATUS, IMAGE FORMING SYSTEM, AND IMAGE FORMING APPARATUS

BACKGROUND OF THE INVENTION AND RELATED ART STATEMENT

The present invention relates to a medium, an image processing apparatus, an image forming system, and an image forming apparatus. More specifically, the present invention relates to a non-transitory computer readable medium storing a driver installer to install a program for operating an image processing apparatus, and an image processing apparatus configured to perform an image processing of input data and output image data according to a printer driver in which a necessary file is installed through the driver installer. Further, the present invention relates to an image forming system including a printing device and an image forming portion configured to form an image on a printing medium according to the image data output from the image processing apparatus, and an image forming apparatus. A non-transitory computer readable medium includes a hard drive, a compact disc, a flash memory, a volatile memory, and the like, but does not include a transitory signal per se.

In a conventional image processing system, it is possible to update printing setting contents of a printer driver to desirable ones and automatically install the desirable ones when a user installs the printer driver in an image processing apparatus. In the conventional image processing system, when the printer driver is installed, it is possible to update the printing setting contents of the printer driver. However, it is difficult to add a new function that the printer driver does not possess.

To this end, Patent Reference has disclosed a conventional image processing system. In the conventional image processing system disclosed in Patent Reference, a plug-in is embedded in a printer driver package in advance, so that the plug-in is introduced to add a printer driver function to become a core.
Patent Reference: Japanese Patent Publication No. 2008-217097

In the conventional image processing system disclosed in Patent Reference, in order to embed the plug-in in the printer driver package in advance, it is necessary to reconstruct the printer driver package every time when the plug-in is updated.

An object of the present invention is to provide a medium, an image processing apparatus, an image forming system, and an image forming apparatus capable of solving the problems.

Further objects and advantages of the invention will be apparent from the following description of the invention.

SUMMARY OF THE INVENTION

In order to attain the objects described above, according to a first aspect of the present invention, a non-transitory computer readable medium stores a driver installer to install a program that causes a computer to execute functional units for operating an image processing apparatus. The driver installer includes a driver installing unit and a plug-in installing unit. The driver installing unit is for retrieving a printer driver package including a file necessary for operating a printer driver, and for installing the file as the printer driver. The plug-in installing unit is for retrieving a plug-in package including a plug-in information file and a plug-in file for adding a function, and for registering the plug-in information file and the plug-in file.

According to a second aspect of the present invention, an image processing apparatus includes a storage unit configured to store the printer driver through the driver installer. The image processing apparatus is configured to perform an image processing to input data and output image data according to the printer driver retrieved from the storage unit.

According to a third aspect of the present invention, an image forming system includes the image processing apparatus and a printing device connected through a transmission medium. The printing device is configured to input the image data output from the image processing apparatus, and to form an image on a recording medium according to the image data thus input.

According to a fourth aspect of the present invention, an image forming apparatus includes the image processing apparatus, and an image forming portion. The image forming portion is configured to form an image on a printing medium according to the image data output from the image processing apparatus.

According to the medium, the image processing apparatus, the image forming system, and the image forming apparatus of the present invention, the driver installer includes the driver installing unit and the plug-in installing unit. The driver installing unit is for retrieving the printer driver package including the file necessary for operating the printer driver, and for installing the file as the printer driver. The plug-in installing unit is for retrieving the plug-in package including the plug-in information file and the plug-in file for adding the function, and for registering the plug-in information file and the plug-in file. Accordingly, when the plug-in is updated, it is possible to add and register only the plug-in package. As a result, it is not necessary to reconstruct the printer driver package, thereby reducing a cost of software development of the image processing apparatus, the image forming system, and the image forming apparatus.

BRIEF DESCRIPTION OF THE DRAWINGS

FIGS. 4(a) and 4(b) are flow charts showing an operation of the driver installer according to the first embodiment of the present invention, wherein FIG. 4(a) is a flow chart showing an entire operation of the driver installer, and FIG. 4(b) is a flow chart showing an operation of a plug-in installing unit of the driver installer;

DETAILED DESCRIPTION OF PREFERRED EMBODIMENTS

Hereunder, embodiments of the present invention will be explained with reference to the accompanying drawings. It should be noted that the present invention is not limited to the accompanying drawings, and the embodiments can be modified within a scope of the present invention.

First Embodiment

Figure 2:
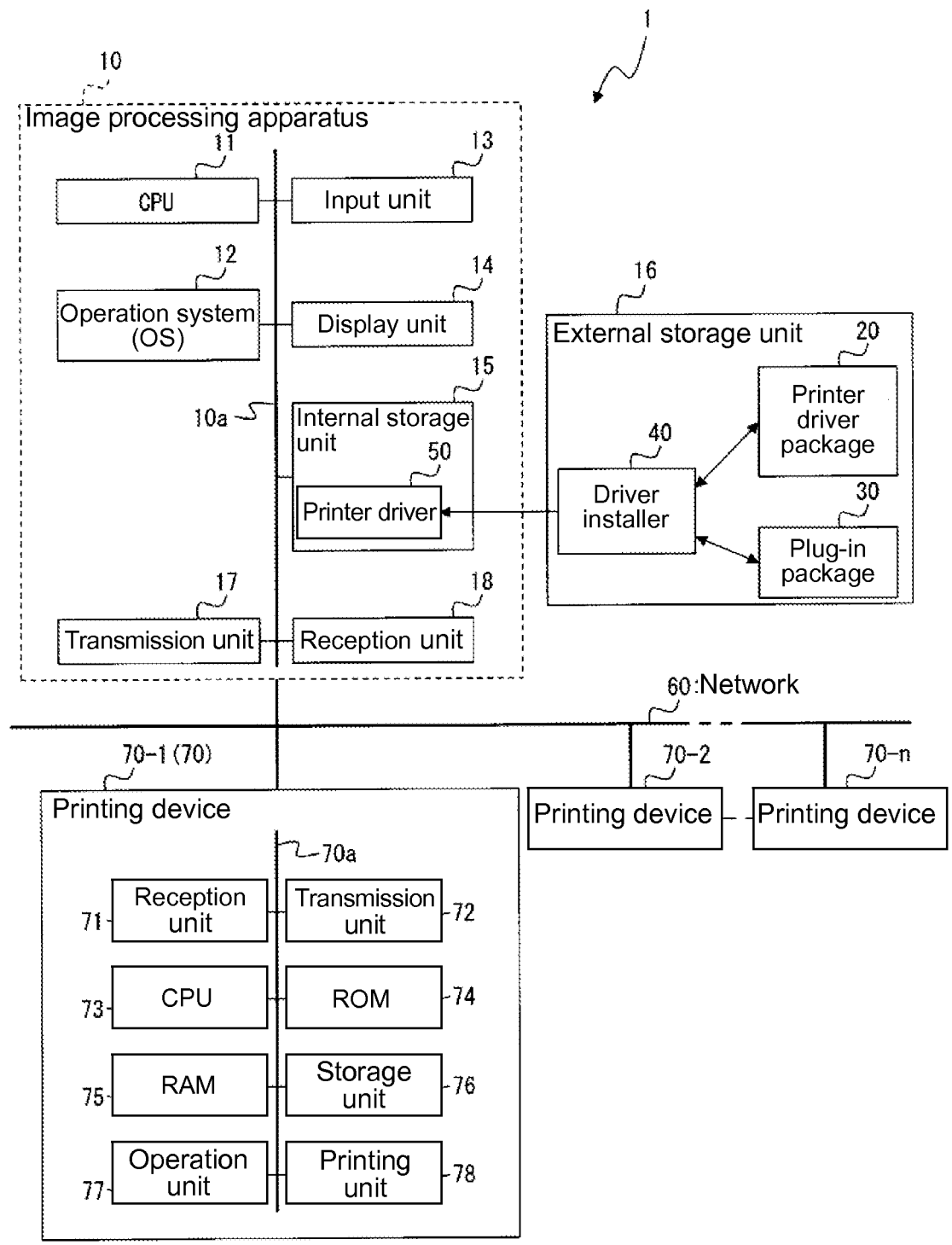
FIG. 2 is a block diagram showing a configuration of an image forming system according to the first embodiment of the present invention.

A first embodiment of the present invention will be explained. FIG. 2 is a block diagram showing a configuration of an image forming system 1 according to the first embodiment of the present invention.

As shown in FIG. 2, the image forming system 1 includes an image processing apparatus 10 for performing an image processing on input data and outputting image data, and a printing device 70 for forming an image on a recording medium according to the image data input thereto. The image processing apparatus 10 is connected to the printing device 70 through, for example, a transmission medium such as a network 60 and the like.

In the embodiment, the image processing apparatus 10 includes a central processing unit (referred to as a CPU) 11 for controlling an entire operation; an operation system (referred to as an OS) 12; an input unit 13 for inputting data from outside; a display unit 14 for displaying an internal status, an operation guide, and the like; an internal storage unit 15 for installing a printer driver 50 as software for operating the image processing apparatus 10; a transmission unit 17 for outputting the image data and the like; and a reception unit 18 for receiving communication control data and the like. The components of the image processing apparatus 10 are connected to each other through an internal bus 10a.

In the embodiment, the image forming system 1 further includes an external storage device 16. The external storage device 16 is configured to store a driver installer 40 as a program for installing the printer driver 50 to the internal storage unit 15; a printer driver package 20 combining a file necessary for operating the printer driver 50; and a plug-in package 30 combining a plug-in information file and a plug-in file for adding a function to the printer driver 50.

In the embodiment, the printing device 70 is configured to form the image on the recording medium such as a paper sheet. The printing device 70 includes a reception unit 71 for receiving the image data and the like; a transmission unit 72 for transmitting the communication control data and the like; a CPU 73 for controlling an entire operation of the printing device 70; a read-only-memory (referred to as ROM) 74; a random-access-memory (referred to as an RAM) 75; a storage unit 76 for temporarily storing the image data; an operation unit 77 for performing a setting operation of a printing operation; and a printing unit 78 for performing the printing operation. The components of the printing device 70 are connected to each other through an internal bus 70a.

Figure 1:
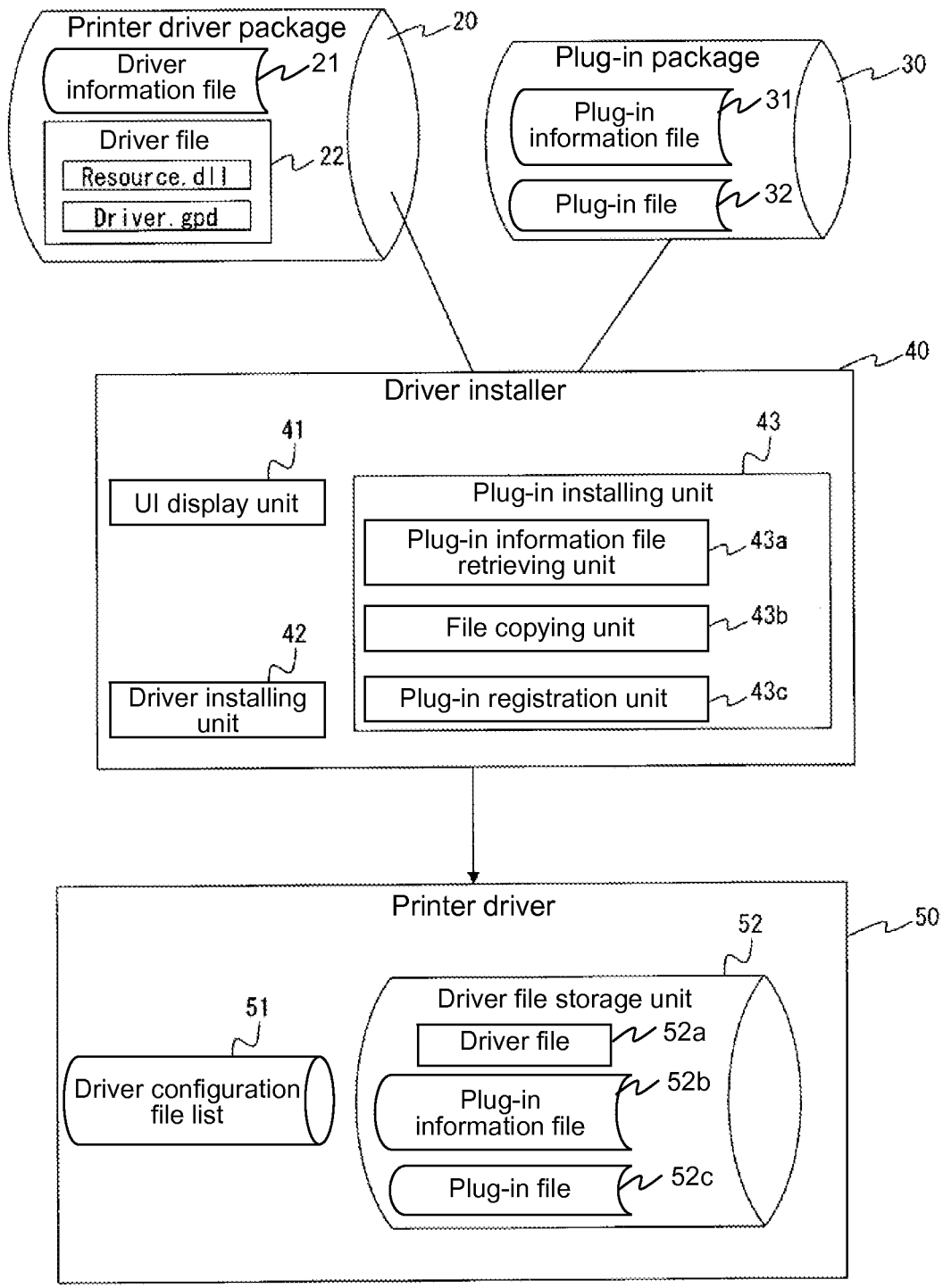
FIG. 1 is a block diagram showing a functional configuration of a driver installer according to a first embodiment of the present invention.

FIG. 1 is a block diagram showing a functional configuration of the driver installer 40, the printer driver package 20, the plug-in package 30, and the printer driver 50 of the internal storage unit 15 according to the first embodiment of the present invention. As shown in FIG. 1, the printer driver package 20 includes a driver information file 21 describing configuration information of the printer driver 50; and a driver file 22 as the printer driver 50 including a group of files necessary for operating the printer driver 50.

In the embodiment, the plug-in package 30 includes a plug-in information file 31 listing a type and a name of a plug-in file 32; and the plug-in file 32 as a library to be retrieved and used with the printer driver 50 as necessary. The library has a file format called DLL and an extension "dll" under Windows (the trademark of Microsoft Corporation).

In general, there are two types of plug-ins of the printer driver 50, namely, a rendering plug-in for performing a drawing process associated with the printing operation, and a user interface (referred to as a UI) plug-in for displaying a printing setting on a screen.

In the embodiment, the driver installer 40 is a program including a UI display unit 41; a driver installing unit 42 for retrieving and installing the printer driver package 20 as the printer driver 50 in the internal storage unit 15 shown in FIG. 2; and a plug-in installing unit 43 for retrieving and registering the plug-in package 30 in the printer driver 50. The UI display unit 41 is provided for displaying information on the screen of the display unit 14 shown in FIG. 2, so that a user selects the type of the printer driver 50 to be installed and the setting of the printer driver 50.

In the embodiment, the plug-in installing unit 43 is a program for storing the plug-in package 30 including the plug-in information file 31 and the plug-in file 32 for adding the function into the printer driver 50 where the necessary file is installed, so that the plug-in information file 31 and the plug-in file 32 are registered in the printer driver 50.

In the embodiment, the plug-in installing unit 43 is a program including a plug-in information file retrieving unit 43a for retrieving the plug-in information file 31 to obtain a plug-in file name; a file copying unit 43b for identifying the plug-in file 32 according to the plug-in file name obtained with the plug-in information file retrieving unit 43a, so that the plug-in file 32 is copied to a driver file storage unit 52; and a plug-in registration unit 43c for adding the plug-in package 30 to a driver configuration file list 51 so that the plug-in package 30 is registered in the printer driver 50.

In the embodiment, the printer driver 50 includes the driver configuration file list 51 listing a group of the files necessary for operating as the printer driver 50; the driver file storage unit 52 for storing the files listed in the driver configuration file list 51; and a control unit (not shown) associated with the printing operation. Further, the driver file storage unit 52 is a memory region for storing a driver file 52a; a plug-in information file 52b; and a plug-in file 52c. A location (a path) of the memory region can be obtained using a function that the OS 12 shown in FIG. 2 is provided with as standard.

In the embodiment, as long as the plug-in information file 31 is written in the driver configuration file list 51, even when the plug-in file 32 is not written, it is configured such that the printer driver 50 retrieves the plug-in file 32 and operates.

An entire operation of the image forming system 1, a configuration and an operation of a conventional driver installer 40A, and an operation of the driver installer 40 in the first embodiment will be separately explained next. First, the entire operation of the image forming system 1 will be explained with reference to FIG. 2.

It is supposed that the printer driver 50 necessary for the operation of the image processing apparatus 10 is stored in the internal storage unit 15 of the image processing apparatus 10. When the input data are input from outside into the input unit 13 of the image processing apparatus 10 shown in FIG. 2, the image processing is applied to the input data according to the printer driver 50, so that the image data are output.

In the next step, the transmission unit 17 of the image processing apparatus 10 transmits the image data to, for example, the printing device 70 through the network 60. Then, the reception unit 71 of the printing device 70 receives the image data thus input, and the image data are temporarily stored in the storage unit 76. When the printing unit 78 receives the instruction of the printing operation input by the user from the operation unit 77, the printing unit 78 retrieves the image data stored in the storage unit 76, and forms (prints) the image on the recording medium according to the image data.

Figures 3A, 3B, 3C:
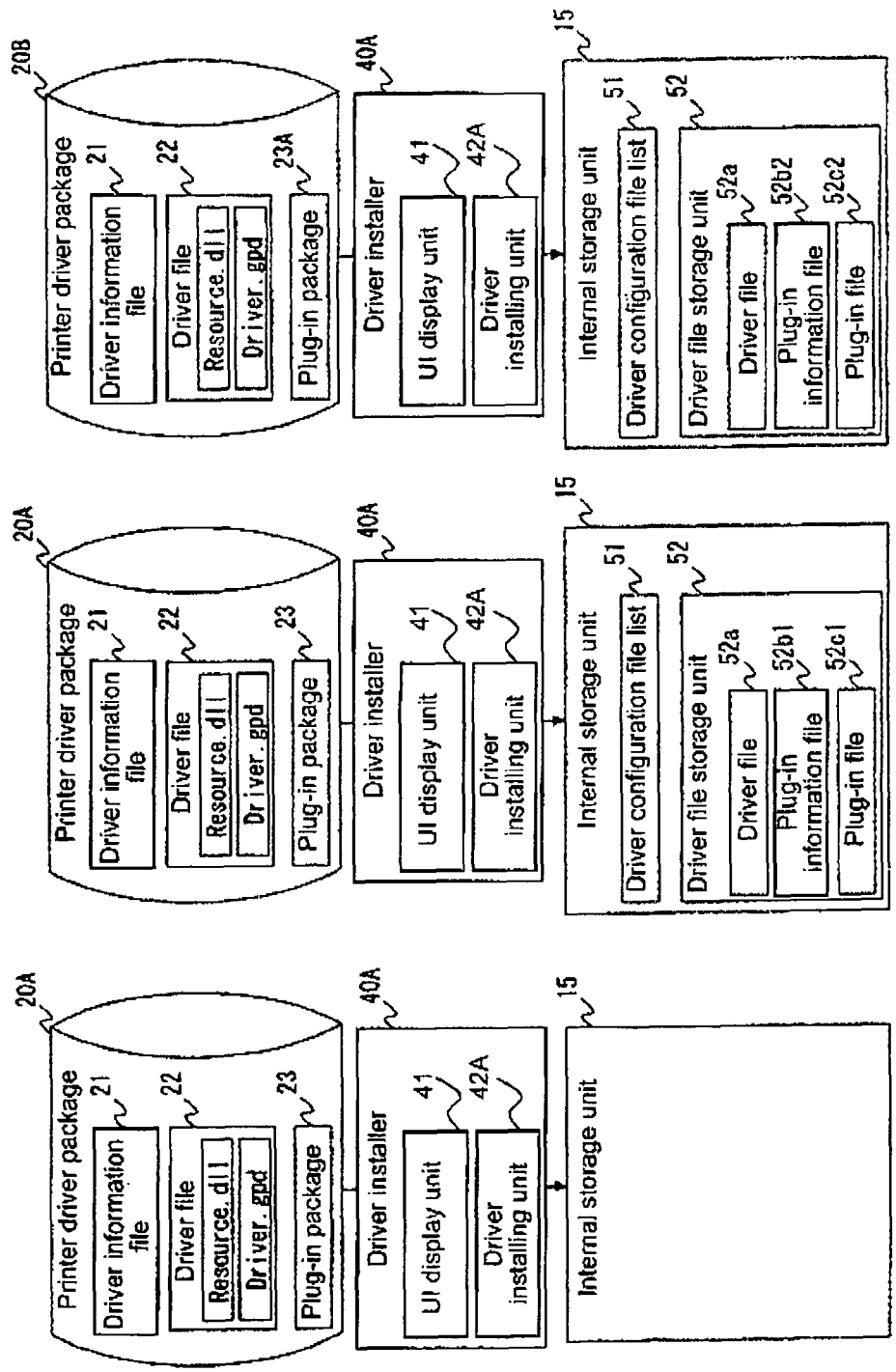
FIGS. 3(a) to 3(c) are block diagrams showing a functional configuration of a conventional driver installer.

FIGS. 3(a) to 3(c) are block diagrams showing the functional configuration of the conventional driver installer 40A. Components of the conventional driver installer 40A similar to those in the first embodiment shown in FIG. 1 are designated with the same numeral references. The configuration and the operation of the conventional driver installer 40A will be explained next with reference to FIGS. 3(a) to 3(c).

FIG. 3(a) is the block diagram showing the functional configuration of a printer driver package 20A, the conventional driver installer 40A, and the internal storage unit 15 before installation.

As shown in FIG. 3(a), the printer driver package 20A includes a plug-in package 23 in addition to the printer driver package 20 in the first embodiment of the present invention. Further, the conventional driver installer 40A does not include the plug-in installing unit 43 of the driver installer 40 in the first embodiment of the present invention, and includes a driver installing unit 42A different from the driver installing unit 42 of the driver installer 40 in the first embodiment of the present invention. The conventional driver installer 40A is a program for retrieving and installing the printer driver package 20A different from the first embodiment as the printer driver in the internal storage unit 15.

FIG. 3(b) is the block diagram showing the functional configuration of the printer driver package 20A, the conventional driver installer 40A, and the internal storage unit 15 where the printer driver is installed after initial installation. As shown in FIG. 3(b), the internal storage unit 15 includes the driver configuration file list 51 and the driver file storage unit 52. Further, the driver file storage unit 52 includes the driver file 52a, a plug-in information file 52b1, and a plug-in file 52c1.

FIG. 3(c) is the block diagram showing the functional configuration of the printer driver package 20B, the conventional driver installer 40A, and the internal storage unit 15 where the printer driver package 20B is installed after the printer driver package 20A is updated. It should be noted that the printer driver package 20B includes the plug-in package 23A thus updated. As shown in FIG. 3(a) the plug-in package 23 is included in the printer driver package 20A. Accordingly, after the initial installation shown in FIG. 3(b), when the printer driver package 20A is updated, it is necessary to reconstruct the new printer driver package 20B in which the plug-in package 23 is updated to a plug-in package 23A. Further, when the new printer driver package 20B is installed in the internal storage unit 15, it is necessary to initialize the internal storage unit 15 so that the internal storage unit 15 changes from the state shown in FIG. 3(b) to the state shown in FIG. 3(a). Accordingly, it is necessary to spend a large cost to develop software of the printer driver for operating the image processing apparatus.

Figure 4A:
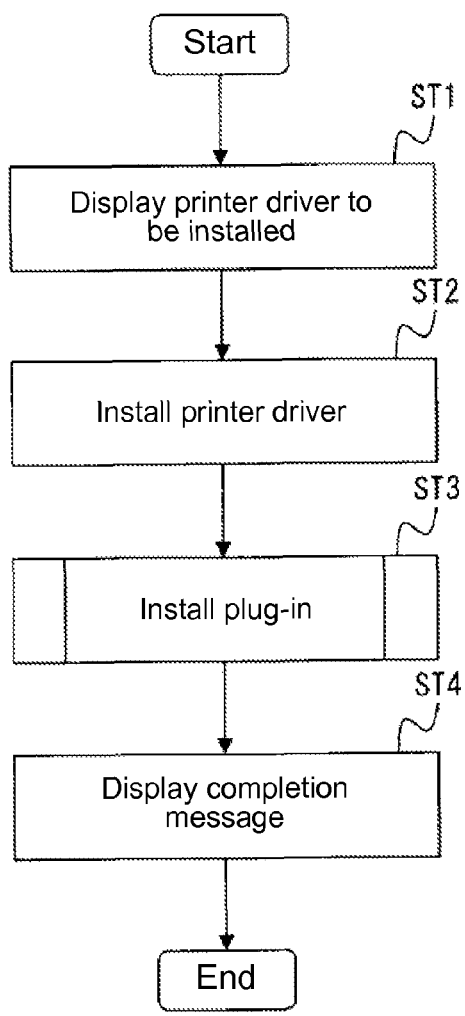
Figure 4B:
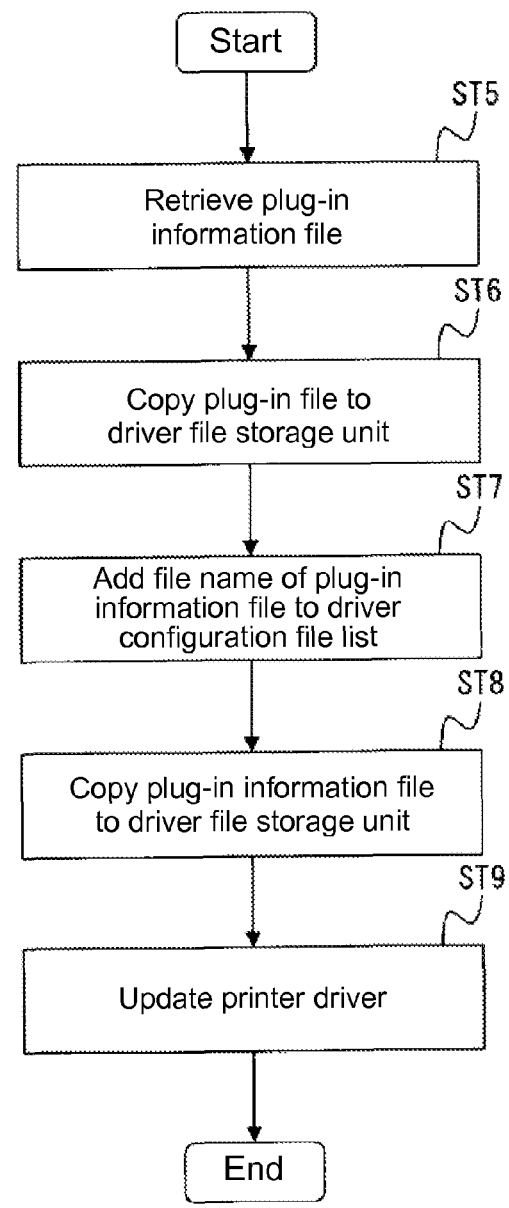

To this end, in the first embodiment of the present invention, the driver installer 40 has the configuration described above, so that the driver installer 40 performs the following operation. FIGS. 4(a) and 4(b) are flow charts showing the operation of the driver installer 40 according to the first embodiment of the present invention. More specifically, FIG. 4(a) is a flow chart showing an entire operation of the driver installer 40, and FIG. 4(b) is a flow chart showing an operation of the plug-in installing unit 43 of the driver installer 40.

Figure 5:
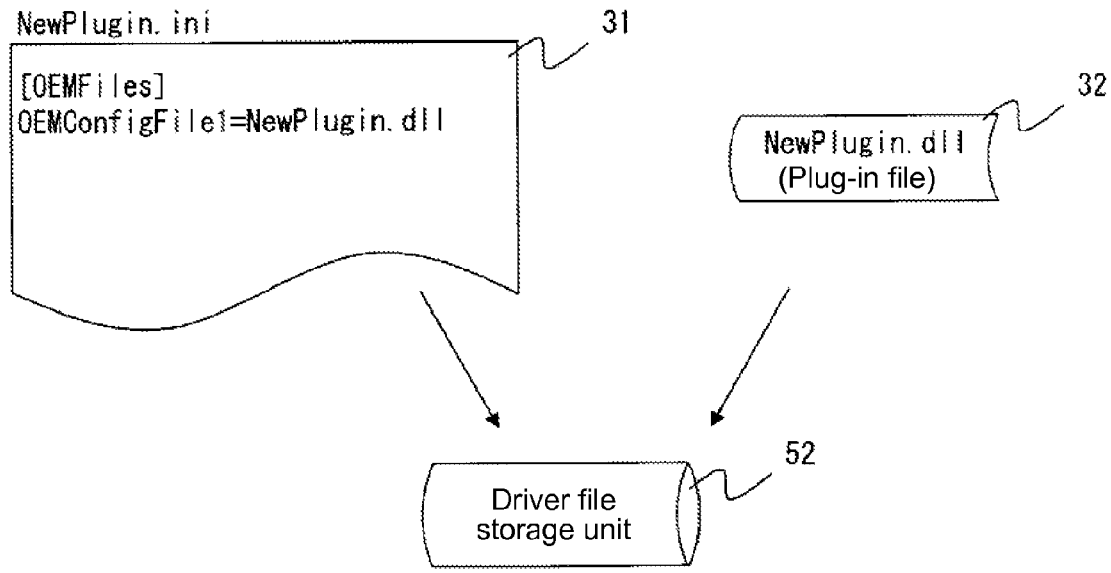
FIG. 5 is a schematic diagram showing the operation of the driver installer when a plug-in file is copied in a driver file storage unit according to the first embodiment of the present invention.
Figure 6:
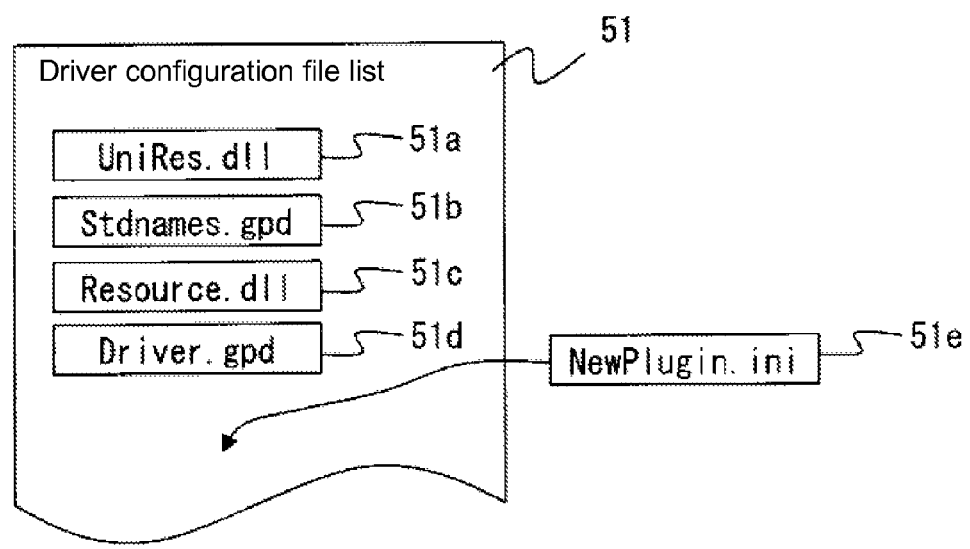
FIG. 6 is a schematic diagram showing the operation of the driver installer when a file name of a plug-in information file is added to a driver configuration file list according to the first embodiment of the present invention.

FIG. 5 is a schematic diagram showing the operation of the driver installer 40 when the plug-in file 32 is copied in the driver file storage unit 52 according to the first embodiment of the present invention. FIG. 6 is a schematic diagram showing the operation of the driver installer 40 when a file name of a plug-in information file 51e is added to the driver configuration file list 51 according to the first embodiment of the present invention.

The operation of the driver installer 40 will be explained based on the flow charts shown in FIGS. 4(a) and 4(b) with reference to FIGS. 1, 5, and 6.

As shown in FIG. 4(a), when the process of the driver installer 40 starts, the process proceeds to step ST1. In step ST1, the printer driver to be installed is displayed on a selection screen (not shown) of the display unit 14, then the process proceeds to step ST2.

In step ST2, the driver installing unit 42 installs the printer driver selected in step ST1, and the process proceeds to step ST3. In step ST3, after the printer driver is installed, the plug-in installing unit 43 installs the plug-in, and the process proceeds to step ST4. In step ST4, after the plug-in is installed, the UI display unit 41 displays a completion message on the selection screen (not shown) of the display unit 14, thereby completing the process.

As shown in FIG. 4(b), when the process of the plug-in installing unit 43 starts, the process proceeds to step ST5. In step ST5, the plug-in information file retrieving unit 43a retrieves the plug-in information file 31, so that the plug-in information file retrieving unit 43a obtains the plug-in file name to identify the plug-in file 32, and the process proceeds to step ST6.

In step ST6, the file copying unit 43b copies the plug-in file 32 to the driver file storage unit 52 as shown in FIG. 5, and the process proceeds to step ST7. In step ST7, the file name of the plug-in information file 51e is added to the driver configuration file list 51 of the printer driver 50 thus installed, and the process proceeds to step ST8.

In step ST8, the plug-in information file 52b is copied to the driver file storage unit 52, and the process proceeds to step ST9. In step ST9, the printer driver 50 is updated using a function that the OS 12 possesses as standard, thereby completing the process.

As described above, in the first embodiment, the driver installer 40 includes the driver installing unit 42 for installing the printer driver package 20 as the printer driver 50 and the plug-in installing unit 43 for registering the plug-in package 30 in the printer driver 50 thus installed. Accordingly, when the plug-in package 30 is updated to add an additional function in the plug-in package 30 as the user desires, it is possible to register the plug-in package 30 updated from the plug-in package 30 provided separately from the printer driver package 20 in the printer driver 50. As a result, it is not necessary to reconstruct or reevaluate the printer driver package 20. Further, since it is not necessary to reconstruct or reevaluate the printer driver package 20, it is possible to reduce a cost of software development in the image processing apparatus 10 and the image forming system 1.

Second Embodiment

Figure 7:
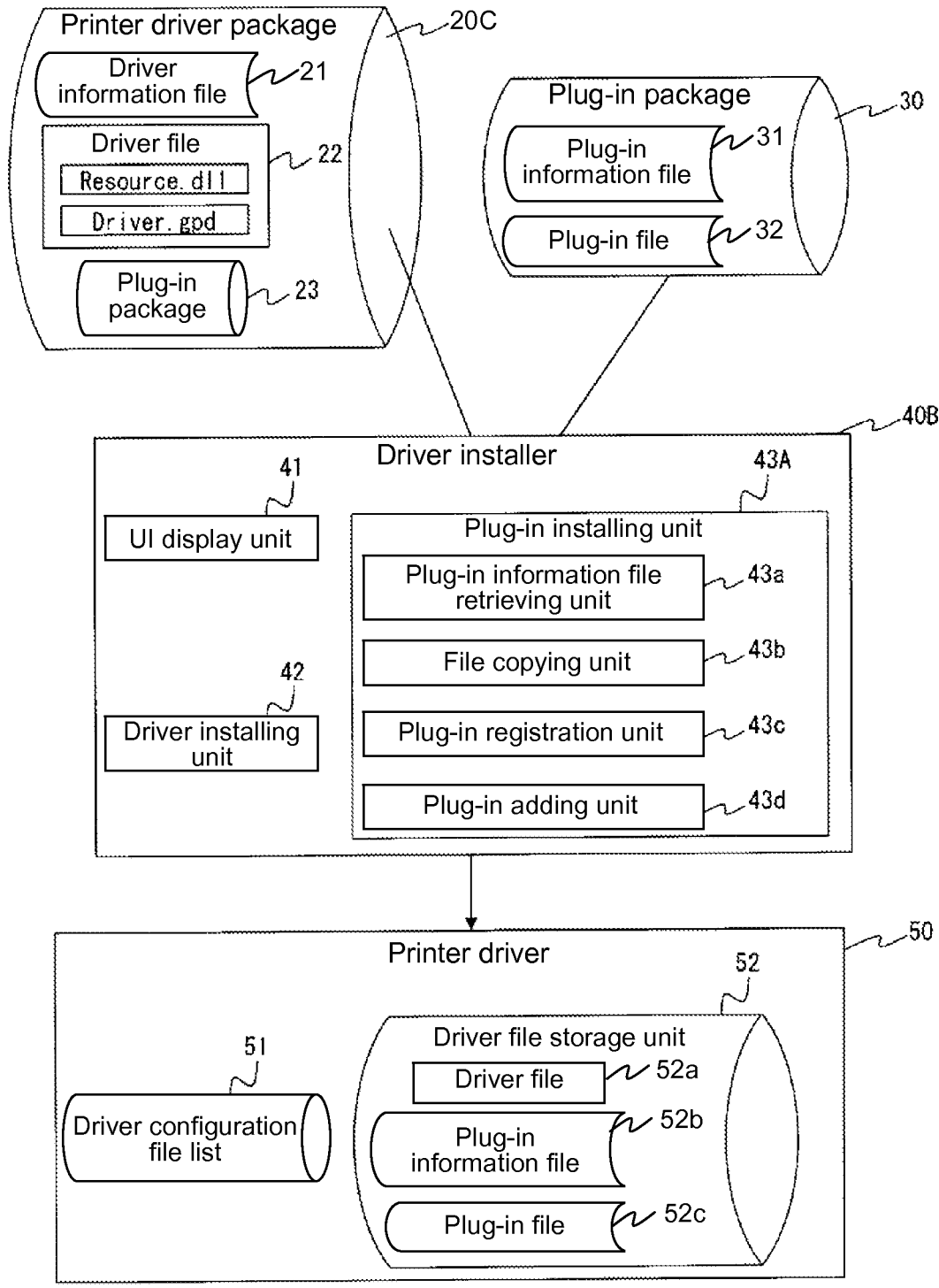
FIG. 7 is a block diagram showing a functional configuration of a driver installer according to a second embodiment of the present invention.

A second embodiment of the present invention will be explained next. FIG. 7 is a block diagram showing a functional configuration of a driver installer 40B according to the second embodiment of the present invention. It should be noted that components in the second embodiment similar to those in the first embodiment shown in FIG. 1 are designated with the same reference numerals.

As shown in FIG. 7, the plug-in package 30 and the printer driver 50 have configurations similar to those in the first embodiment, and a printer driver package 20C and the driver installer 40B have configurations and functions different from those in the first embodiment.

More specifically, as opposed to the printer driver package 20 in the first embodiment, the printer driver package 20C includes the plug-in package 23. Further, as opposed to the driver installer 40 in the first embodiment, the driver installer 40B includes the UI display unit 41 and the driver installing unit 42 having configurations similar to those in the first embodiment, and a plug-in installing unit 43A having a configuration and a function different from those in the first embodiment. More specifically, the driver installing unit 42 includes the plug-in package 23 written in the driver information file 21 indicating and to be installed as the printer driver 50 in the state that the plug-in package 23 is registered.

In the second embodiment, the plug-in information file retrieving unit 43a includes a plug-in adding unit 43d in addition to the plug-in information file retrieving unit 43a, the file copying unit 43b, and the plug-in registration unit 43c similar to the first embodiment. The plug-in adding unit 43d is a program for obtaining the file name of the plug-in information file 52b from the driver configuration file list 51 of the printer driver 50, and for rewriting the plug-in information file 52b stored in the driver file storage unit 52. Other configurations in the second embodiment are similar to those in the first embodiment.

It should be noted that an entire operation of the image processing system in the second embodiment is similar to that in the first embodiment, and an explanation thereof is omitted. A process of the driver installer 40B in the initial installation is similar to that in the first embodiment shown in FIG. 4(a). It should be noted that in step ST2 shown in FIG. 4(a), the driver installing unit 42 registers the plug-in package 23 as a part of the printer driver 50. Accordingly, the plug-in package 23 is stored in the driver file storage unit 52 as the plug-in information file 52b and the plug-in file 52c.

Figure 8:
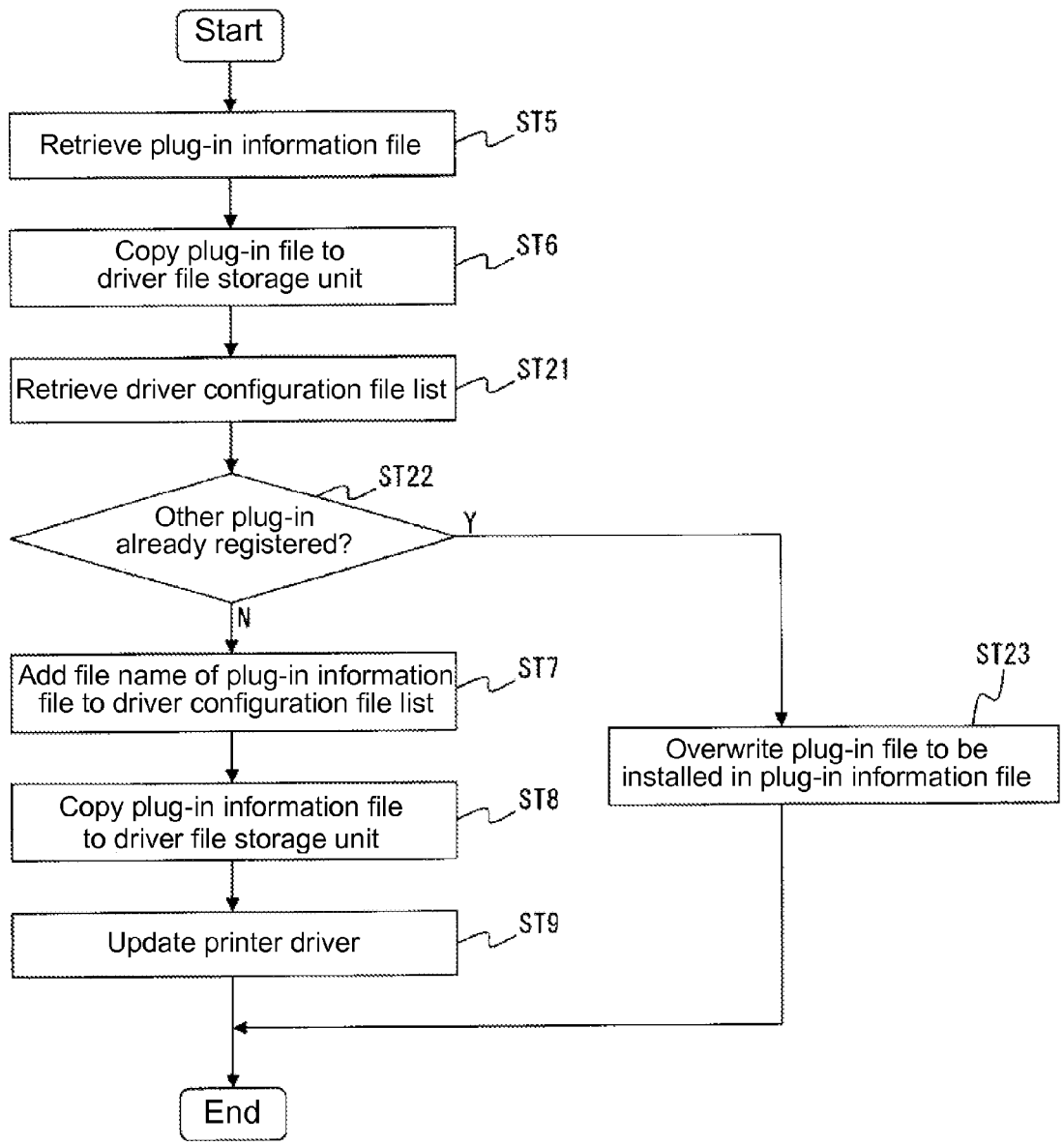
FIG. 8 is a flow chart showing an operation of the driver installer when a plug-in is updated according to the second embodiment of the present invention.
Figure 9:
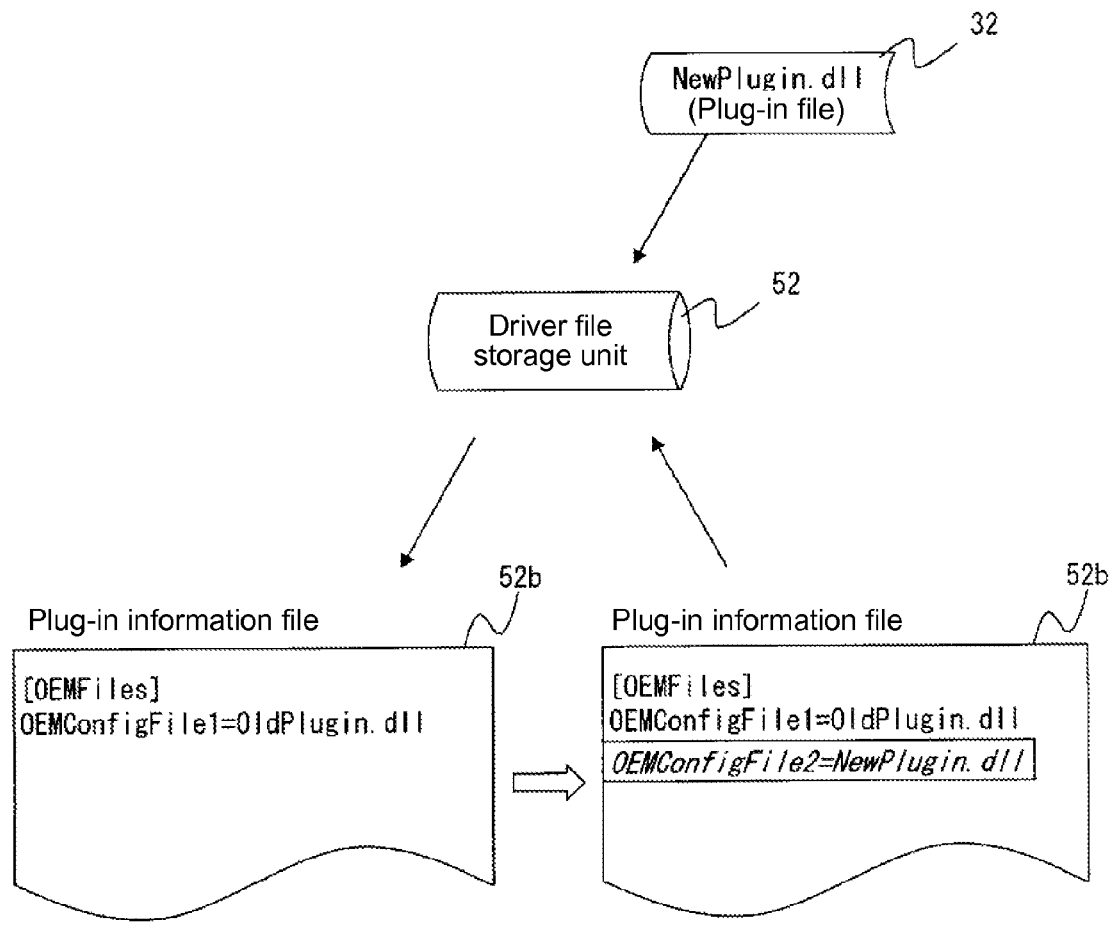
FIG. 9 is a schematic diagram showing the operation of the driver installer when a plug-in file is added to a plug-in information file according to the second embodiment of the present invention.

An operation of the driver installer 40B when the plug-in is updated will be explained next. FIG. 8 is a flow chart showing the operation of the driver installer 40B shown in FIG. 7 when the plug-in is updated according to the second embodiment of the present invention. It should be noted that components in the second embodiment similar to those in the first embodiment are designated with the same reference numerals. FIG. 9 is a schematic diagram showing the operation of the driver installer 40B when the plug-in file 32 is added to the plug-in information file 52b according to the second embodiment of the present invention. FIG. 9 is the schematic diagram showing step ST6 and step ST23 shown in FIG. 8. The process of the driver installer 40B will be explained based on the flow chart shown in FIG. 8 with reference FIGS. 7 and 9.

As shown in FIG. 8, when the process of updating the plug=in starts, the process proceeds to step ST5. In step ST5, the plug-in information file retrieving unit 43a retrieves the plug-in information file 31, so that the plug-in information file retrieving unit 43a obtains the plug-in file name to identify the plug-in file 32, and the process proceeds to step ST6.

In step ST6, the file copying unit 43b copies the plug-in file 32 to the driver file storage unit 52 as shown in FIG. 9, and the process proceeds to step ST7, and the process proceeds to step ST21. In step ST21, the file copying unit 43b retrieves the driver configuration file list 51, and the process proceeds to step ST22.

In step ST22, it is determined whether other plug-in is already registered. More specifically, when the plug-in information file 52b exists in the driver configuration file list 51, it is determined that other plug-in is already registered. When the plug-in information file 52b does not exist in the driver configuration file list 51, it is determined that other plug-in is not registered. When it is determined that other plug-in is not registered (N) in step ST22, the process proceeds to step ST7. When it is determined that other plug-in is already registered (Y) in step ST22, the process proceeds to step ST23.

When it is determined that other plug-in is not registered (N) in step ST22, the process from step ST7 to step ST9 similar to that in the first embodiment is performed, thereby completing the process. In step ST23, when it is determined that other plug-in is already registered, the plug-in file 32 to be installed is overwritten in the plug-in information file 52b in the driver file storage unit 52, thereby completing the process of updating the plug-in.

In the process of installing in the first embodiment, the printer driver 50 retrieves only the plug-in information file 52b registered first. Accordingly, when the plug-in file 32 is registered in the printer driver package 20C in advance, the plug-in file 32 added later does not operate. In other words, in the first embodiment, even the plug-in information file 31 is additionally registered to the printer driver 50, the plug-in information file 52b registered as the plug-in package 23 is retrieved, and the plug-in file 32 is not retrieved.

On the other hand, in the second embodiment, the driver installer 40B is configured such that the plug-in file 32 can be added to the plug-in information file 52b that is already combined in the driver file storage unit 52. Accordingly, in addition to the effect of the first embodiment, it is possible to operate the plug-in file 32 thus added in addition to the plug-in package 23, thereby increasing the printer driver 50 that is capable of operating.

Third Embodiment

Figure 10:
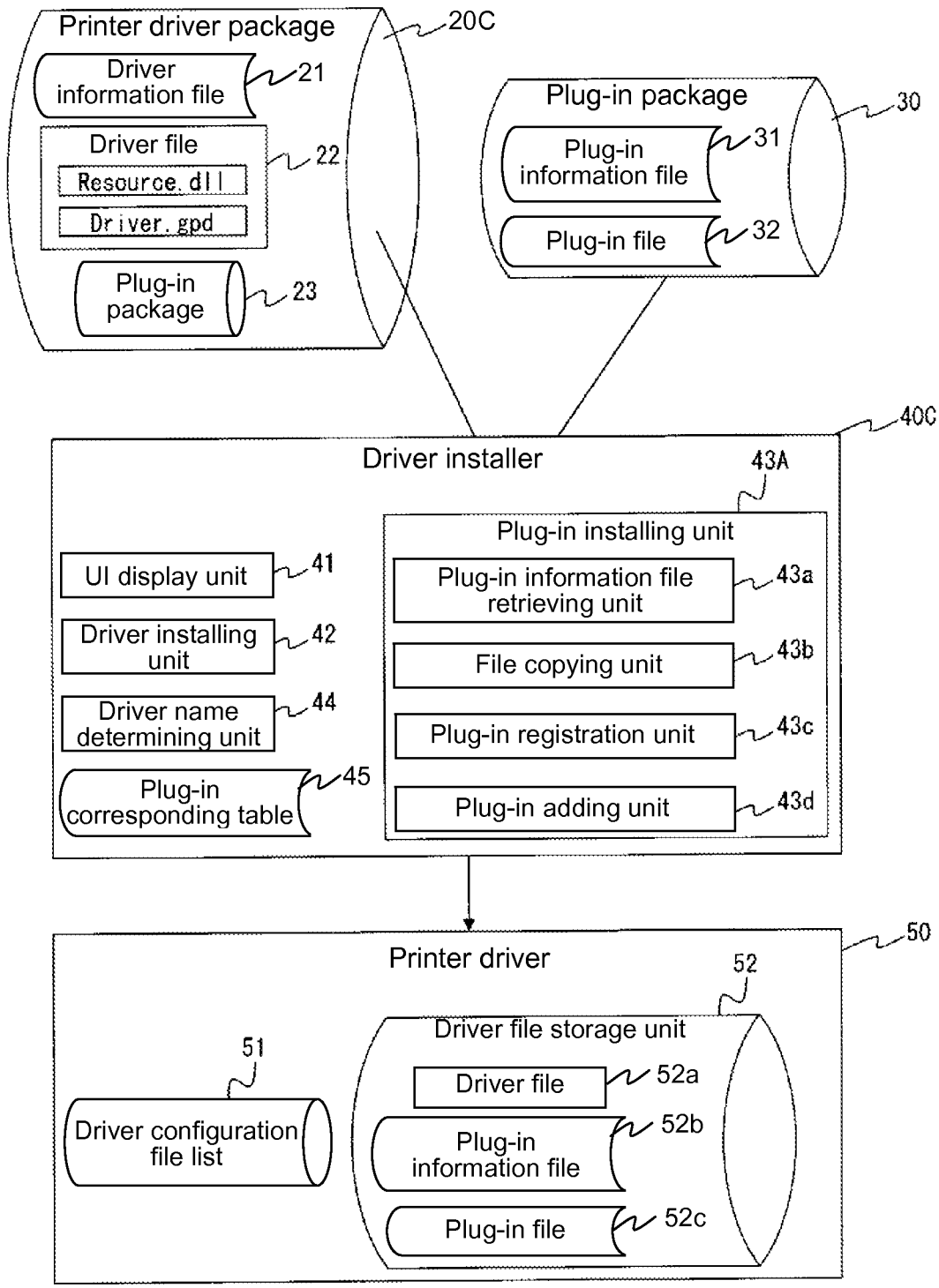
FIG. 10 is a block diagram showing a functional configuration of a driver installer according to a third embodiment of the present invention.
Figures 11, 12:
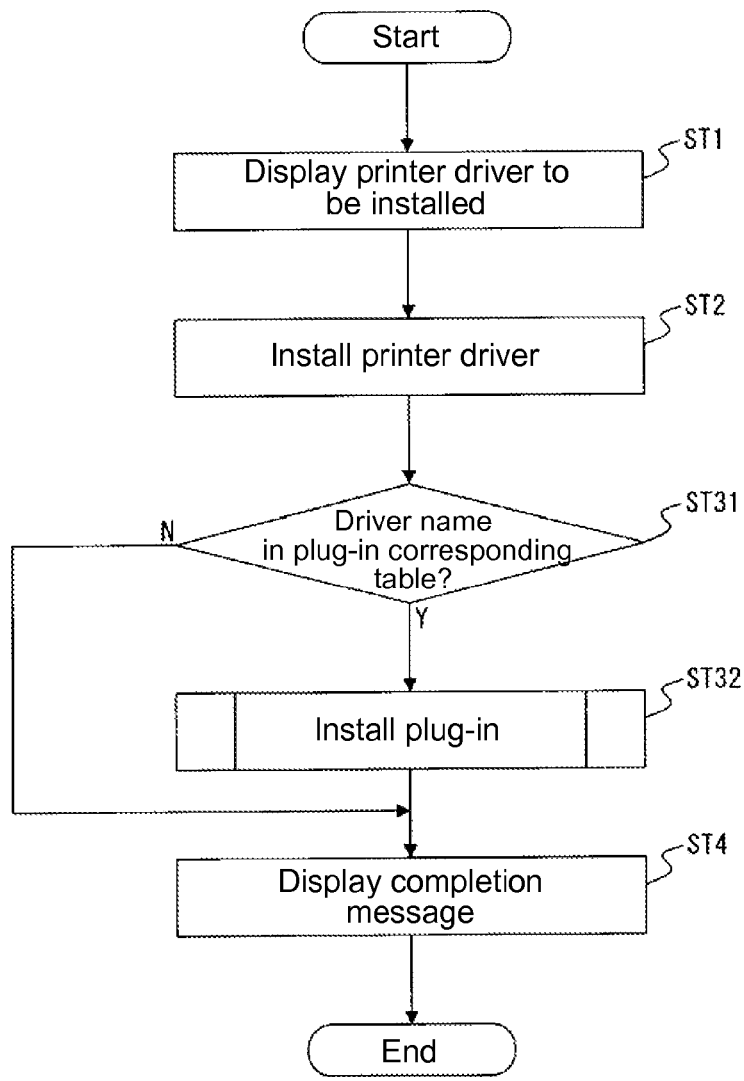
FIG. 11 is a schematic view showing an example of a plug-in corresponding table according to the third embodiment of the present invention.
FIG. 12 is a flow chart showing an operation of the driver installer when a plug-in is installed according to the third embodiment of the present invention.

A third embodiment of the present invention will be explained next. FIG. 10 is a block diagram showing a functional configuration of a driver installer 40C according to the third embodiment of the present invention. It should be noted that components in the third embodiment similar to those in the first embodiment shown in FIG. 1 and the second embodiment shown in FIG. 7 are designated with the same reference numerals. FIG. 11 is a schematic view showing an example of a plug-in corresponding table 45 according to the third embodiment of the present invention.

As shown in FIG. 10, the printer driver package 20C has a configuration similar to that in the second embodiment, the plug-in package 30 and the printer driver 50 have configurations similar to those in the first embodiment, and the driver installer 40C has a configuration and a function different from those in the first embodiment and the second embodiment.

In the embodiment, the driver installer 40C includes a driver name determining unit 44 and the plug-in corresponding table 45 as plug-in corresponding information in addition to the configuration of the driver installer 40B in the second embodiment. The driver name determining unit 44 is provided for comparing the driver name of the printer driver 50 thus installed with a driver name column of the plug-in corresponding table 45, so that the driver name determining unit 44 determines a corresponding plug-in.

FIG. 11 is the schematic view showing the example of the plug-in corresponding table 45 shown in FIG. 10. As shown in FIG. 11, the plug-in corresponding table 45 includes the driver names and the corresponding plug-ins, so that it is possible to obtain the plug-in corresponding with the driver name as a key.

It should be noted that an entire operation of the image processing system in the third embodiment is similar to that in the first embodiment and the second embodiment, and an explanation thereof is omitted. A process of the driver installer 40B in the second embodiment when the plug-in is updated is similar to that in the first embodiment shown in FIG. 4(b).

An operation of the driver installer 40C in the installation process will be explained next. FIG. 12 is a flow chart showing the operation of the driver installer 40C shown in FIG. 10 when the plug-in is installed according to the third embodiment of the present invention. It should be noted that components in the third embodiment similar to those shown in FIG. 4(a) in the first embodiment are designated with the same reference numerals.

The process of the driver installer 40C will be explained based on the flow chart shown in FIG. 12 with reference FIGS. 10 and 11. As shown in FIG. 12, when the process of the driver installer 40C starts, the process proceeds to step ST1. In step ST1, similar to the first embodiment, the printer driver to be installed is displayed on the selection screen (not shown) of the display unit 14, then the process proceeds to step ST2.

In step ST2, similar to the first embodiment, the driver installing unit 42 installs the printer driver 50 selected in step ST1, and the process proceeds to step ST31. In step ST31, after the printer driver 50 is installed, the driver name determining unit 44 searches the driver name of the printer driver 50 in the plug-in corresponding table 45 to determine whether the driver name (the plug-in) is in the plug-in corresponding table 45. When the driver name determining unit 44 determines that the driver name is in the plug-in corresponding table 45 (Y), the process proceeds to step ST32. When the driver name determining unit 44 determines that the driver name is not in the plug-in corresponding table 45 (N), the process proceeds to step ST4.

In step ST32, when there is the corresponding plug-in, the plug-in is installed, and the process proceeds to step ST4. It should be noted that the process in step ST32 shown in FIG. 12 is similar to that shown in FIG. 8 in the second embodiment. In step ST4, after the plug-in is installed, the UI display unit 41 displays the completion message on the selection screen (not shown) of the display unit 14, thereby completing the process.

As described above, in the third embodiment, the driver installer 40C is configured to include the plug-in operation enable information of the printer driver to be installed. Accordingly, the driver installer 40C is configured to install the appropriate plug-in in the printer driver 50 according to the driver name associated with the printer to be selected during the installation. As a result, even in an image forming system not capable of returning the plug-in operation enable information through bi-directional communication, it is possible to deal with a new function without updating a printer firmware and the printer driver package 20C.

Fourth Embodiment

Figure 13:
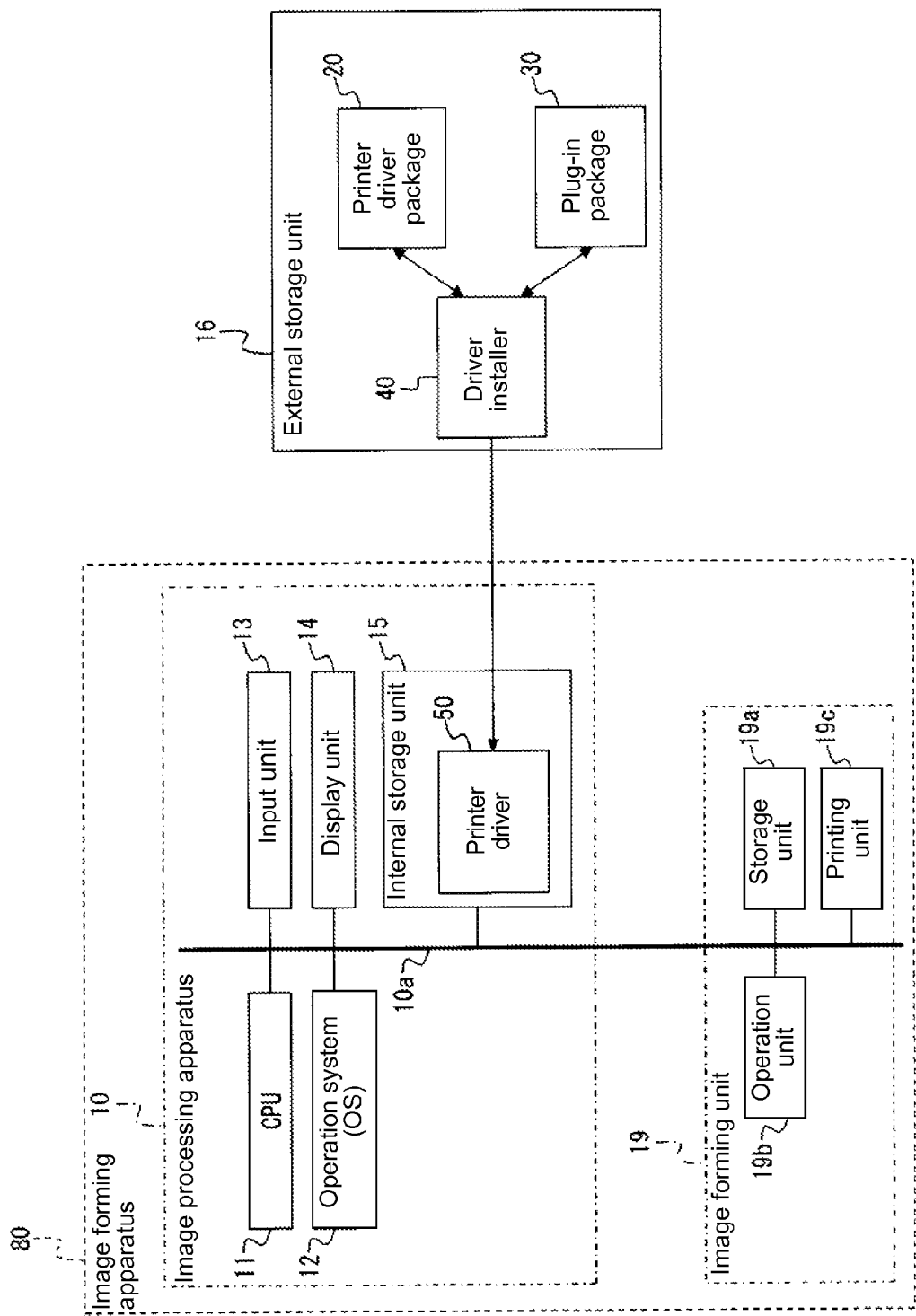
FIG. 13 is a block diagram showing a configuration of an image forming apparatus according to a fourth embodiment of the present invention.

A fourth embodiment of the present invention will be explained next. FIG. 13 is a block diagram showing a configuration of an image forming apparatus 80 according to the fourth embodiment of the present invention. It should be noted that components in the fourth embodiment similar to those of the image forming system 1 in the first to third embodiments shown in FIG. 2 are designated with the same reference numerals.

As shown in FIG. 13, in the fourth embodiment, similar to the image processing apparatus 10 of the image forming system 1 in the first embodiment, the image forming apparatus 80 includes the central processing unit (referred to as the CPU) 11; the operation system (referred to as the OS) 12; the input unit 13; the display unit 14; the internal storage unit 15; and the external storage unit 16. Further, the image forming apparatus 80 includes an image forming unit 19. Similar to the first embodiment, the components of the image forming apparatus 80 are connected to each other through the internal bus 10a. The image forming unit 19 is configured to form an image on a recording medium according to the image data to be generated with the image processing apparatus 10.

In the fourth embodiment, the image forming unit 19 includes a storage unit 19a for temporarily storing the image data generated with the image processing apparatus 10; an operation unit 19b for the user to input setting for forming the image and instruct execution of the image forming; and a printing unit 19c for retrieving the image data stored in the storage unit 19a and forming the image on the recording medium according to an instruction received through the operation unit 19b.

In the fourth embodiment, when input data are input from outside into the input unit 13 of the image processing apparatus 10 shown in FIG. 13, the input data are processed with the image processing to generate the image data. After the image data are generated, the image data are temporarily stored in the storage unit 19a. When the user operates the operation unit 19b to receive the instruction from the user, the printing unit 19c forms the image on the recording medium according to the image data retrieved from the storage unit 19a.

In the fourth embodiment, it should be noted that the operation of the driver installer 40 is similar to that in the first embodiment. Accordingly, it is possible to attain the effects similar to those in the first embodiment.

It should be noted that the present invention is not limited to the first to fourth embodiments described above, and may be modified or applied to various applications. The applications and modifications may include as follows.

In the first to fourth embodiments described above, the plug-in package 30 is registered as an example, and the number of the plug-in package 30 is not limited to one. Further, the type of plug-in file to be installed is not limited.

In the third embodiment described above, it is determined whether the plug-in is installed with reference to the plug-in corresponding table 45. Alternatively, the plug-in may be installed without any conditions, and the plug-in corresponding table 45 may be installed together with the plug-in. Accordingly, it may be configured to determine whether the operation is performed when the plug-in is operated.

In the first to fourth embodiments described above, the driver installer program of the image processing apparatus 10 is explained. The present invention may be applicable to a program for installing software into a copier, a facsimile, a multi function product, and the like.

The disclosure of Japanese Patent Application No. 2012-232763, filed on Oct. 22, 2012, is incorporated in the application.

While the invention has been explained with reference to the specific embodiments of the invention, the explanation is illustrative and the invention is limited only by the appended claims.

What is claimed is:

1. A non-transitory computer readable medium storing a driver installer to install a program that causes a computer to execute functional units, said driver installer comprising:
    a driver installing unit for retrieving a printer driver package including a file necessary for operating a printer driver, and for installing the file as the printer driver;
    a plug-in installing unit for retrieving a plug-in package including a plug-in information file and a plug-in file for adding a function, and for registering the plug-in information file and the plug-in file;
    plug-in corresponding information including a plurality of driver names, a plurality of corresponding plug-ins, and a correlation between the driver names and the corresponding plug-ins; and
    a driver name determining unit for determining whether one of the driver names in the plug-in corresponding information matches a driver name of the printer driver,
    wherein said printer driver includes a driver configuration file list that lists a group of files necessary for an operation; and
    a driver file storage unit for storing the group of files listed in the driver configuration file list,
    said plug-in installing unit includes a plug-in information file retrieving unit for retrieving the plug-in information file;
    a file copying unit for copying the plug-in file and the plug-in information file to the driver file storage unit; and
    a plug-in registration unit for adding the plug-in information file to the driver configuration file list,
    said driver name determining unit determines one of the corresponding plug-ins correlated to the driver name of the printer driver according to the plug-in corresponding information, and
    said plug-in installing unit installs the printer driver and the one of the corresponding plug-ins correlated to the driver name of the printer driver.

2. The non-transitory computer readable medium according to claim 1, wherein said plug-in information file includes a specific plug-in file name.

3. The non-transitory computer readable medium according to claim 2, wherein said plug-in installing unit is configured to install the plug-in package into the driver file storage unit, and
    said plug-in installing unit includes a plug-in adding unit for obtaining the file name of the plug-in information file from the driver configuration file list, and for rewriting the plug-in information file stored in the driver file storage unit.

4. The non-transitory computer readable medium according to claim 3, wherein said driver installer further includes:
    plug-in corresponding information including a driver name of the printer driver and a plug-in corresponding to the driver name; and
    a driver name determining unit for comparing the driver name installed in the printer driver with the driver name in the plug-in corresponding information so that the driver name determining unit determines a corresponding plug-in, and
    said driver installer installs the plug-in corresponding information when the plug-in installing unit installs the plug-in so that the driver name determining unit compares the driver name when the plug-in is operated.

5. The non-transitory computer readable medium according to claim 1, wherein said driver installer further includes a display unit for displaying information for selecting a type and a setting of the printer driver.

6. An image processing apparatus comprising:
    said driver installer stored in the non-transitory computer readable medium according to claim 1;
    a storage unit for storing the printer driver; and
    a transmission unit for performing an image processing on input data and outputting image data according to the printer driver retrieved from the storage unit.

7. An image forming system comprising:
    said image processing apparatus according to claim 6; and
    a printing device for inputting the image data output from the image processing apparatus, and for forming an image on a recording medium according to the image data.

8. An image forming apparatus comprising:
    said image processing apparatus according to claim 6: and
    an image forming portion for inputting the image data output from the image processing apparatus, and for forming an image on a recording medium according to the image data.

* * * * *